July 31, 1956     A. W. WICKESBERG     2,756,905
BUTTER DISPENSER
Filed April 3, 1953     2 Sheets-Sheet 1
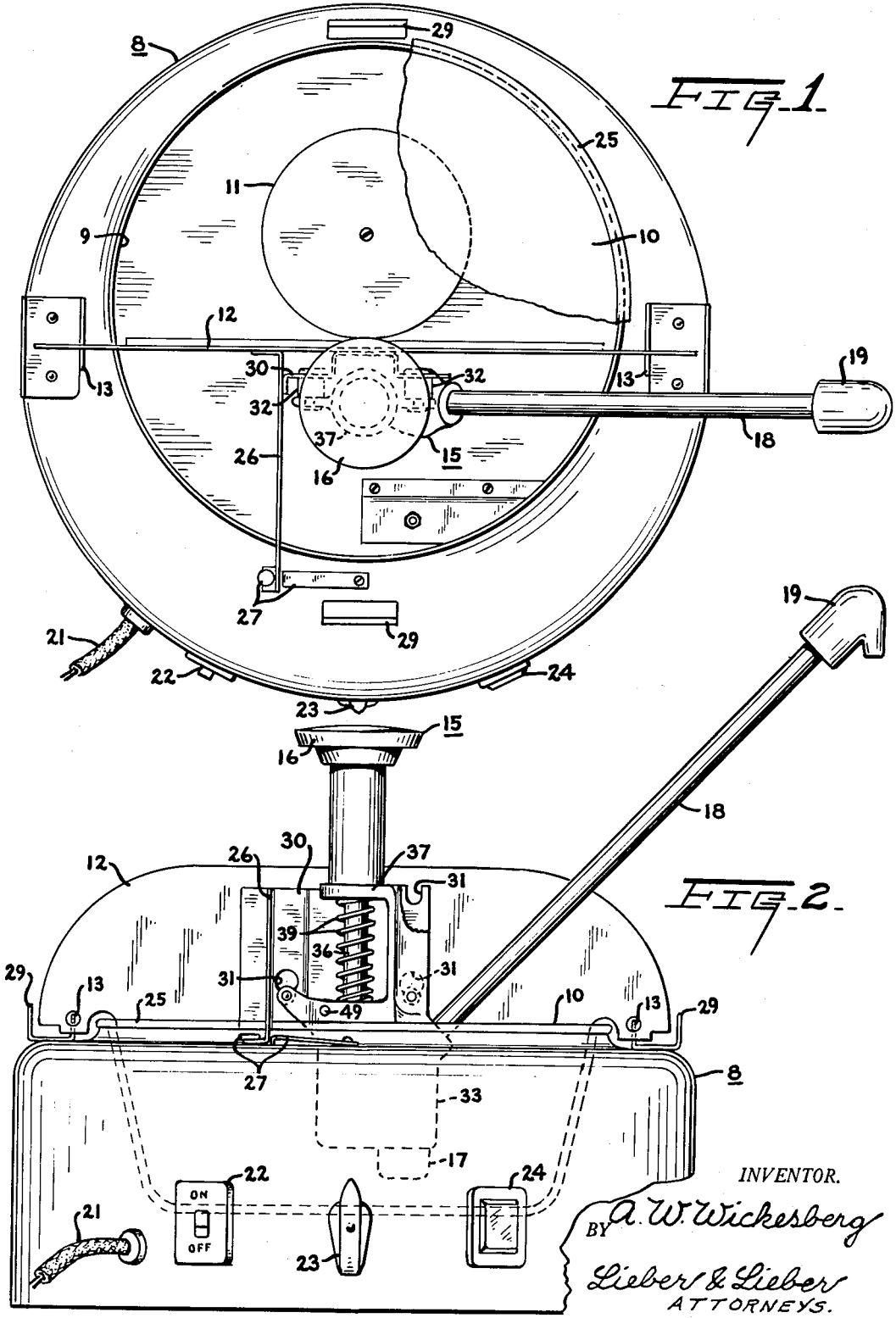
INVENTOR.
BY A. W. Wickesberg
Lieber & Lieber
ATTORNEYS.

July 31, 1956  A. W. WICKESBERG  2,756,905
BUTTER DISPENSER
Filed April 3, 1953  2 Sheets-Sheet 2
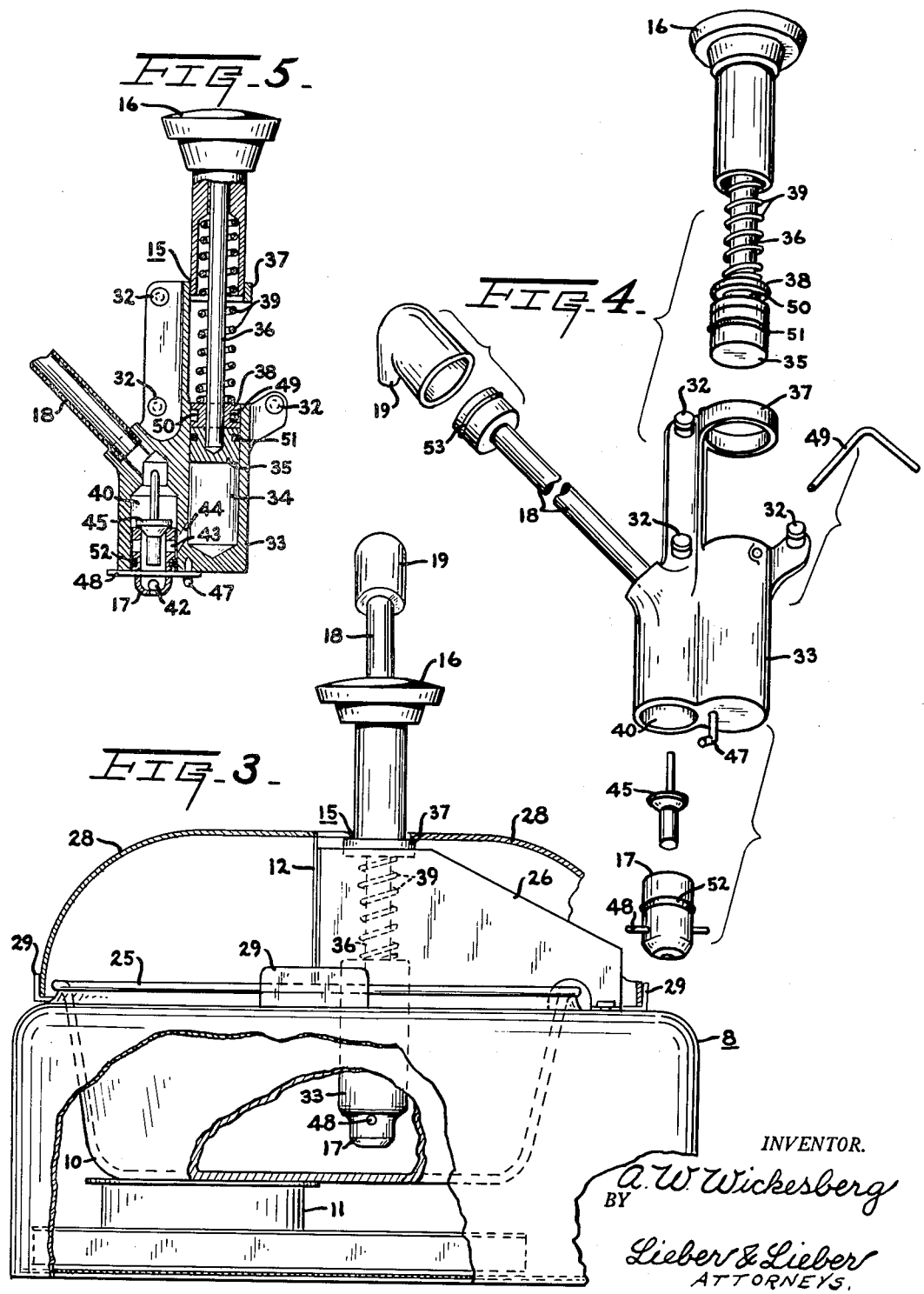
INVENTOR.
A. W. Wickesberg
BY
Lieber & Lieber
ATTORNEYS.

United States Patent Office 2,756,905
Patented July 31, 1956

2,756,905

BUTTER DISPENSER

Alfred W. Wickesberg, Milwaukee, Wis.

Application April 3, 1953, Serial No. 346,605

7 Claims. (Cl. 222—146)

The present invention relates generally to improvements in the art of dispensing liquids such as melted butter, and relates more particularly to improvements in the construction and operation of butter melting, measuring and dispensing devices especially adapted for buttering popcorn.

A primary object of this invention is to provide an improved dispensing unit for melted butter or the like which is extremely compact and durable in construction and which is moreover highly efficient, economical and sanitary in actual use.

It is, of course, common practice to sell popcorn in public places such as theaters, auditoriums, fairs and the like, the popcorn being merchandised in either buttered or unbuttered condition. To enable the concession operator or clerk to serve butter to the individual customers desiring the same, various types of butter melting and dispensing assemblages have heretofore been proposed. However, none of these prior devices have proven entirely satisfactory for their intended purpose either because they are too complicated and costly to warrant the purchase and use thereof, or because they are impractical and difficult to handle due to their size and bulkiness, or because they are unsanitary, unsightly and inaccurate in operation.

It is therefore a more specific object of my present invention to provide an improved butter melting and dispensing unit which obviates all of these disadvantages and objections.

Another specific object of this invention is to provide an improved butter dispenser which is unitary in construction, light in weight and exceedingly portable.

Another specific object of the invention is to provide an improved butter server which comprises relatively few parts, all of which are readily accessible for cleaning, replacements or repair.

Another specific object of my invention is to provide an improved butter server of novel construction which is adapted to melt and maintain butter in a sanitary condition and which is operable by a novice to accurately dispense individual servings of the melted butter in measured amounts.

Still another specific object of the present invention is to provide an improved and highly attractive dispensing unit for melted butter which may be manufactured and sold at low cost and which is extremely economical and highly dependable in operation.

A further specific object of the present invention is to provide an improved butter dispensing unit comprising, a main casing having a receptacle therein for confining molten butter, supporting means spanning the receptacle and detachably secured to the casing beyond the receptacle, and a molten butter dispensing pump detachably secured to the supporting means and having its actuating mechanism projecting thereabove, the pump having its inlet located within and near the bottom of the receptacle and also having a discharge nozzle extending laterally of and beyond the casing.

These and other more specific objects and advantages of the invention will be apparent from the following detailed description.

A clear conception of the several features constituting my invention, and of the mode of constructing and of utilizing butter dispensing units embodying the improvements, may be had by referring to the drawings accompanying and forming a part of this specification, wherein like reference characters designate the same or similar parts in the various views.

Fig. 1 is a top view of one of the improved butter melting and dispensing units, embodying the invention, the butter confining receptacle being broken away and the transparent plastic cover having been omitted to reveal normally concealed structure;

Fig. 2 is a fragmentary rear view of the improved unit with the transparent cover also having been omitted therefrom for the sake of clarity;

Fig. 3 is a fragmentary side view of the dispenser with portions of the outer casing and the butter confining receptacle broken away and with the two-piece cover shown in section to again reveal normally concealed structure;

Fig. 4 is an exploded perspective view of the butter dispensing pump of the improved assemblage; and Fig. 5 is a fragmentary transverse vertical section through the pump.

While the invention has been shown and described herein as being specifically embodied in a butter melting and dispensing device adapted for commercial use in public show places and concessions, it is not desired or intended to thereby unnecessarily restrict the scope or limit the utility thereof; and it is also contemplated that certain descriptive terms used herein shall be given the broadest possible interpretation consistent with the disclosure.

Referring to the drawings, the improved butter dispensing unit comprises, in general, a main casing 8 having an annular top opening 9, a butter receiving receptacle or bowl 10 positioned within the opening 9, heating means such as an electric heating element 11 housed within the casing 8 below the receptacle 10 and adapted to melt butter or the like placed within the receptacle and to retain the butter in melted condition, supporting means such as a yoke 12 spanning the casing opening 9 and the receptacle 10 and detachably secured at opposite ends to the casing 8 beyond the periphery of the receptacle 10 as by means of suitable clips 13 attached to the casing, and a molten butter dispensing pump 15 detachably secured to a medial portion of the supporting yoke 12 in a manner to be hereinafter more fully described, the pump being generally of the reciprocating plunger type having its actuating handle 16 projecting above the yoke 12 and having its inlet and discharge valve assemblage 17 located below the yoke 12 within and near the bottom of the receptacle 10 and also having an angularly projecting discharge conduit 18 provided with a discharge nozzle 19 located laterally of and beyond the receptacle 10 and the casing 8.

The annular main casing 8 may be conveniently formed of sheet metal with the aid of punches and dies, and the electric heating element 11 may be of any well known available thermostatically controlled type adapted to be connected with a suitable source of electricity by means of a cord 21 with an on-off switch 22, timer control 23 and an indicating light 24 suitably connected therewith and positioned on the rear of the casing. The receptacle or bowl 10 may be constructed of any suitable materials and may be provided with an upper annular flange 25 adapted to be seated on the casing 8 about the opening 9 with the bottom of the receptacle or bowl 10 resting on or adjacent to the heating element 11. The supporting member or yoke 12 which spans the receptacle 10 and is detachably secured at opposite ends to the casing 8 may be provided with a laterally extending stabilizing leg portion 26 coacting with the casing 8 outwardly beyond the periphery of the receptacle 10, the leg 26 preferably also being detachably secured to the casing as by means of a suitable spring clip 27. To protect the molten butter within the receptacle 10 and provide for maximum sanitation, the unit may also be provided with a suitable two-piece cover 28 adapted to be retained in position by means of suitable L-shaped brackets 29 so as to substantially cover the receptacle 10 during use of the device, and the cover 28 may be formed of transparent plastic or the like so as to permit the contents of the receptacle 10 to be viewed by both the operator and prospective customers. To provide for convenient attachment of the pump 15 to the yoke 12, a suitable sheet metal bracket 30 may be provided, the bracket being firmly secured to the medial portion of the yoke 12 and to its stabilizing leg 26 in any suitable manner and having flanged portions provided with openings or eyes 31 adapted to receive corresponding hook-like attachment lugs 32 formed on the pump body.

The pump 15 is of the reciprocable plunger type and comprises a body portion 33 having a cylindrical chamber 34 within which a plunger 35 is adapted to reciprocate upon actuation of the handle or actuating member 16 which is connected to the plunger 35 by means of a rod 36 guided by a ring 37 and the removable end closure 38 for the chamber 34, the plunger 35 and actuating member 16 of the pump being automatically returnable after each downward stroke by means of a suitable compression spring 39. Laterally of the chamber 34, the pump body 33 is provided with an inlet and discharge chamber 40, the chamber 40 being closed by means of a downwardly removable inlet and discharge valve assemblage 17 having a lower inlet normally closed by a ball check valve 42 and communicating past the ball check valve through passages 43, 44 with the chamber 34, the valve assembly 17 also having an upper check valve 45 normally seated thereon to shut off communication with the discharge conduit 18. The entire valve assemblage 17 is normally located within and near the bottom of the receptacle 10 when the pump is in position on the yoke 12, but upon removal of the pump from its active position, the inlet and discharge valve assembly 17 may be entirely dismantled and downwardly removed from its chamber 40 by turning the body of the valve 17 to thereby release the radiating pin 48 carried thereby from the locking pin 47; and the entire pump actuating mechanism including the actuating portion 16 and the plunger 35 together with its associated mechanism may be upwardly removed from the pump body by merely removing a key 49 normally piercing the pump body and coacting with an annular groove 50 in the closure 38 to thereby release the closure from its locked position. To prevent leakage from either the chamber 34 or the chamber 40, the plunger 35 may also be provided with a suitable annular rubber ring or gasket 51 and the valve body 17 may be likewise provided with a similar annular rubber ring or gasket 52. To permit complete dismantling of the pump 15, the discharge conduit 18 may be screw-threaded into the body 33, and the discharge nozzle may either be screw-threaded onto the conduit 18 or it may be slip-fitted thereon with a tight fit being provided by a suitable rubber ring or gasket 53.

In actual use, the improved unit is first assembled by placing the receptacle 10 in position within the opening of the casing 8 with the yoke 12 and its stabilizing leg 26 then being secured to the casing in an obvious manner after which the pump 15 may be secured in place on the bracket 30 with the cover 28 finally being applied after a supply of butter has been placed within the receptacle 10. The heating element 11 may then be connected by means of the cord 21 with a suitable source of electrical supply and the switch 22 may be turned on. If the heating element is thermostatically controlled, it will then heat to a predetermined temperature to melt the butter within the bowl 10, and the heat may be periodically increased manually by means of the timer control button 23. When it is desired to supply servings of melted butter from the receptacle 10 to popcorn or the like, it is only necessary to position the bag or box of popcorn beneath the nozzle 19 of the pump 15 and the actuating knob 16 may then be depressed against the compression of the spring 39. Upon depression of the actuating control element 16, the plunger 35 of the pump is urged downwardly within the chamber 34 to force the molten butter within such chamber through the passages 44, 43 and upwardly past the gravity check valve 45 in the chamber 40 and through the conduit 18 and discharge nozzle 19. Upon release of the element 16, the spring 39 automatically returns the element 16 and the plunger 35 to its uppermost position thereby creating a suction within the chamber 34 and through the passages 44, 43 to cause the ball check valve 42 to raise from its seat and draw a fresh supply of molten butter through the inlet past the valve 42 and into the chamber 34 to fill the same with a predetremined supply, the check valve 45 being seated by gravity and suction during such operation. As the chamber 34 becomes filled and the suction created therein ceases, the ball check valve 42 again automatically seats itself to close the inlet and the pump is ready to dispense another individual serving of a predetermined amount of molten butter. When it is desired to clean the unit, the pump may be readily removed from the bracket 30 and may be dismantled in an obvious manner by first turning the valve 17 to disengage the pin 48 from the pin 47 and then removing the same axially and by also removing the pin 49 to permit axial removal of the actuating element 16 and its associated mechanism including the plunger 35, the nozzle 19 and conduit 18 also being removable in an obvious manner. The yoke 12 may then likewise be removed and access is then obtained to the receptacle 10 which may also be removed for washing or cleaning.

From the foregoing detailed description, it is apparent that the present invention provides an improved butter dispensing unit which is extremely simple and compact in construction and highly efficient and flexible in operation. The improved unitary assemblage may be readily manufactured and assembled at low cost and may be efficiently operated in a most sanitary manner to dispense or serve predetermined quantities of molten butter whenever required. All parts of the pump 15 may be readily dismantled for periodic cleaning and inspection and may be readily reassembled by a novice without need for any tools whatsoever, and it is a simple matter to replace any necessary parts of the pump including the actuating mechanism 16, 35, the main body portion 33, the inlet and discharge valve assemblage 17, the conduit 18 or the nozzle 19. In addition to serving as a rigid support for the pump 15, the yoke 12 and its stabilizing leg 26 also serves to retain the receptacle or bowl 10 in position within the casing opening and this yoke and its stabilizing leg also coact with the brackets 29 to support the two-piece dome-shaped cover 28. The improved units are sold at extremely low cost and result in maximum profit to the user due to the fact that there is little or no waste of butter, and individual servings of a given capacity are a direct result of its use. In addition, the provision of a transparent cover renders the device extremely eye appealing to the customer since the molten butter which is visible through the cover gives a very appetizing appearance. The improved units have proven extemely satisfactory and high efficient and dependable in actual use, and butter may be dispensed thereby in a most sanitary and accurate manner.

It should be understood that it is not desired to limit this invention to the exact details of construction or to the precise mode of operation herein shown and described, since various modifications within the scope of the claims may occur to persons skilled in the art to which this invention pertains.

I claim:

1. A butter dispensing unit comprising, a main casing, a cup-shaped receptacle removably housed within said casing for confining molten butter, supporting means spanning the open top of said receptacle and detachably secured to said casing outwardly beyond the brim of said receptacle on opposite sides thereof, a brace extending laterally from the medial portion of said supporting means and coacting with said casing beyond said receptacle brim to provide a three-point support, and a molten butter dispensing pump detachably secured to and suspended from said three-point support and having its actuating mechanism projecting thereabove, said pump having its inlet located within and near the bottom of said receptacle and also having a discharge nozzle extending laterally of and outwardly beyond the side wall of said casing.

2. A butter dispensing unit comprising, a main casing, a receptacle removably housed within said casing for confining molten butter, elongated supporting means spanning said receptacle and detachably secured at its opposite ends to said casing beyond said receptacle, said supporting means having a laterally extending stabilizing portion coacting with another portion of said casing beyond said receptacle, and a molten butter dispensing pump detachably secured to said supporting means and having its actuating mechanism projecting thereabove, said pump having its inlet located within and near the bottom of said receptacle and also having a discharge nozzle extending laterally of and beyond said casing.

3. A butter dispensing unit comprising, a main casing, a receptacle removably housed within said casing for confining molten butter, an elongated supporting member spanning said receptacle and detachably secured at its opposite ends to opposite sides of said casing beyond said receptacle, said supporting member having a stabilizing leg extending laterally therefrom and detachably secured to said casing beyond said receptacle, and a molten butter dispensing pump detachably secured to and suspended from said supporting means and having its actuating mechanism projecting thereabove, said pump having its inlet located within and near the bottom of said receptacle and also having a discharge nozzle extending laterally of and upwardly beyond said casing.

4. A butter dispensing unit comprising, a main casing, a receptacle removably housed within said casing for confining molten butter, said casing having clips secured thereto on opposite sides of said receptacle, a yoke spanning said receptacle and detachably cooperable with said clips, a bracket secured at one end to a medial portion of said yoke and having its opposite end detachably cooperable with another portion of said casing beyond said receptacle, and a molten butter dispensing pump detachably cooperable with said bracket and having its actuating mechanism projecting above said yoke, said pump having its inlet located within and near the bottom of said receptacle and also having a discharge nozzle extending laterally of and beyond said casing.

5. A butter dispensing unit comprising, a main casing, a receptacle removably housed within said casing for confining molten butter, supporting means spanning said receptacle and detachably secured to said casing beyond said receptacle, and a molten butter dispensing pump detachably secured to said supporting means and having a body portion projecting downwardly into said receptacle, the body portion of said pump having an upwardly open chamber for removably housing a plunger having its actuated mechanism projecting thereabove, said pump body also having a downwardly open chamber disposed laterally of said upwardly open chamber for removably housing an inlet and discharge valve assembly normally located within and near the bottom of said receptacle, said downwardly open chamber communicating at its upper end with a discharge nozzle extending laterally of and beyond said casing and said valve assembly being downwardly removable therefrom.

6. A butter dispensing unit comprising, a main casing, a receptacle removably housed within said casing for confining molten butter, supporting means spanning said receptacle and detachably secured to said casing beyond said receptacle, and a molten butter dispensing pump having a unitary body portion provided with laterally disposed chambers, means for detachably securing said pump to said supporting means with the actuating mechanism thereof projecting above said body portion, said pump having a plunger reciprocably confined within one of said chambers and also having a downwardly removable inlet and discharge valve assemblage normally confined within the other of said chambers and located within and near the bottom of said receptacle, and stop means removably confined within said plunger confining chamber for limiting the reciprocable movement of said plunger therein, the valve confining chamber of said pump communicating at its upper end with a discharge nozzle extending laterally of and beyond said casing.

7. A butter dispensing unit comprising, a main casing, a butter confining receptacle removably housed within said casing, heating means housed entirely within said casing below said receptacle for melting butter confined therein, supporting means spanning said receptacle and detachably secured to said casing beyond the periphery of said receptacle and a molten butter dispensing pump detachably secured to said supporting means and having its actuating mechanism projecting thereabove, said pump having its inlet located within and near the bottom of said receptacle and also having a discharge nozzle extending laterally of and beyond said casing.

References Cited in the file of this patent

UNITED STATES PATENTS

| | | |
|---|---|---|
| 1,871,655 | Bond | Aug. 16, 1932 |
| 2,022,208 | Lacke | Nov. 26, 1935 |
| 2,598,188 | Minton | May 27, 1952 |
| 2,601,943 | Torrese | July 1, 1952 |